3,551,351
REGENERATION OF NYLON USED TO TREAT BEER

David W. Murray and Richard Charles Quittenton, London, Ontario, Canada, assignors to John Labatt Limited, London, Ontario, Canada
No Drawing. Filed Mar. 5, 1968, Ser. No. 710,626
Int. Cl. B01d 15/06
U.S. Cl. 252—415      2 Claims

ABSTRACT OF THE DISCLOSURE

Nylon pieces which have been used to stabilize beer and have adsorbed polyphenolics from the beer are regenerated by being placed in a dilute solution of hypochlorite bleach, e.g. a solution containing about 0.5 to 5% by weight of sodium hypochlorite or calcium hypochlorite.

BACKGROUND OF THE INVENTION (1) Field of the invention

This invention relates to a method of regenerating nylon which has been used to stabilize beer.

(2) Description of the prior art

It has been known for sometime that nylon (an insoluble, protein-like polyamide resin, e.g. polyhexamethylene adipamide and poly ε-caproamide) can be used to stabilize and prolong the shelf life of peer. Nylon is a semi-selective adsorbent with great affinity for polyphenolic compounds, such as anthocyanogens and isohumulones. Anthocyanogens represent all substances know in wort and beer to yield red pigments on heating with hydrochloric acid.

Much evidence has been accumulated over the years which indicate that polyphenolics are constituents of beer haze so that it is readily understood why nylon treatment benefits beer stability. It is also undersood that polyphenolics may also have a bearing on flavour or oxidation stability of beer. Thus, it will be evident that treatment of beer with nylon represents an important step in the brewing process.

However, if treatment of beer with nylon is to gain wide acceptance, the nylon must be reusable. At the present cost of nylon, there is little commercial interest in its use as a beer stabilizer, unless it can be substantially totally regenerated by being cleansed of all absorbed material.

Previous test work with nylon for stabilizing beer has shown that an average regeneration of 87% can be obtained by treating the nylon with a 0.1 N sodium hydroxide solution. However, it will be evident that this is not satisfactory since only 5 regenerations would decrease the adsorptive capacity of the nylon by 50%.

SUMMARY OF THE INVENTION

According to this invention it has been determined that nylon which has been contacted with beer can be substantially totally regenerated by being contacted with a dilute hypochlorite bleach solution. Thus, it was found that substantially total regeneration of the nylon could be obtained with a commercial hypochlorite bleach solution containing at least about 0.5% by weight of the hypochlorite. Sodium hypochlorite and calcium hypochlorite solutions have been found to be equally effected regenerants.

DESCRIPTION OF THE PREFERRED EMBODIMENTS

As the hypochlorite solutions do not appear to dissolve nylon under the regeneration conditions employed, it is suggested that the affinity of such material for adsorption by nylon is somehow reduced by the action of the hypochlorite thus facilitating its removal.

The amount of hypochlorite required to regenerate a particular quantity of nylon will depend upon the weight of polyphenolics adsorbed thereon which, in turn, will depend upon the available surface area of nylon in such quantity. Laboratory studies have shown that a quantity of 100 mesh nylon fines can be substantially totally regenerated by about 8 to 10 times its weight of 1.0% by weight hypochlorite bleach solution. There is generally no advantage to be gained by using a bleach solution containing more than 5% by weight of the hypochlorite. The ability of hypochlorite bleach solution to regenerate nylon does not appear to be appreciably effected by the pH of the solution nor by the temperature of the solution over the range 20° C. to 60° C.

It has been found in this work that substantially total regeneration of nylon occurs when it has been freed of the brown discolouration of adsorbed polyphenolics by the action of hypochlorite bleach solution, and this fact has been utilized in some cases to provide rapid visual assessment of the degree and rate of regeneration obtained.

In the following examples which illustrate the invention, three types of nylon 66 were used: CIL #3850, an English experimental batch 100 mesh nylon recommended in the Journal of the Institute of Brewing 1960; "Polypenco," a 100 mesh nylon moulding powder; and ¼". O.D. nylon tubing supplied by Wilson Science of Toronto.

EXAMPLE 1

25 feet of ¼" O.D. nylon tubing was cut into ½" lengths, placed into 1 litre of beer and allowed to stand for 7 days at 35° F. The beer was decanted off the nylon and analyzed for anthrocyanogens and iso-humulones by standard brewery methods. Similarly, 1 litre of the same beer was held at 35° F. for a week and analyzed as the control.

ANALYTICAL VALUES P.P.M.

|  | Anthocyanogens | Iso-humulones |
|---|---|---|
| Control beer (beer 1) | 67 | 16 |
| Nylon treated beer | 43 | 11 |
| P.p.m. removed by nylon | 24 | 5 |

The beer subjected to this nylon treatment lost 24 p.p.m. anthocyanogens and 5 p.p.m. iso-humulones.

The completely spent nylon was treated overnight with 1 litre of a 5% commercial bleach solution. "EFORT"— Mount Brydges, Ont.—4% NaOCl. This removed the brown nylon stain. The bleach was washed off with water and the nylon resuspended in another beer (as it would be in normal practice). This beer and the nylon-free beer control were maintained at 35° F. for 7 days then analyzed.

This regeneration cycle was repeated for a second and third time.

ANALYTICAL VALUES P.P.M.

|  | After 1st regenerations (beer 2) | After 2nd regenerations (beer 3) | After 3rd regenerations (beer 4) |
|---|---|---|---|
| Anthocyanogens: |  |  |  |
|   Control beer | 62 | 46 | 47 |
|   Nylon treated beer | 34 | 26 | 14 |
|   P.p.m. adsorbed | 28 | 20 | 33 |
| Iso-humulones: |  |  |  |
|   Control beer | 8 | 16 | 18 |
|   Nylon treated beer | 6 | 10 | 5 |
|   P.p.m. adsorbed | 2 | 6 | 13 |

Thus, over 3 regeneration cycles 28, 20 and 33 p.p.m. anthocyanogen were removed by the nylon as opposed to 24 p.p.m. with the original nylon treatment.

EXAMPLE 2

Two portions of 0.15 g. of brewery grade nylon powder (100 mesh–CIL DS 3850) were agitated for 1 hour in separate 170 ml. volumes of beer to ensure that the nylon surface was fully spent. The nylon was freed from the beer by filtration through sintered glass, thoroughly washed with water and dried in an air oven at 80° C. The nylon treated beer and an untreated control were analyzed for anthocyanogens.

Analytical values

| | Anthocyanogens, p.p.m. |
|---|---|
| Control beer | 67 |
| Beer after nylon treatment | 40 |
| P.p.m. removed by nylon | 27 |

One portion of the recovered nylon was treated with 25 ml. of 5% "EFORT" for 2 hours to effect regeneration. The brown stain was removed by bleach treatment. The other portion remained fully spent as control.

Both were agitated for 1 hour with 170 ml. of the original beer, then filtered free of nylon. Both the regenerated and spent nylon treated beers were analyzed for anthocyanogens.

Analytical values

| | Anthocyanogens, p.p.m. |
|---|---|
| Original beer | 67 |
| Beer+spent nylon | 66 |
| Beer+regenerated nylon | 41 |
| P.p.m. removed by nylon | 25 |

EXAMPLE 3

Bleach solutions of 0.05%, 0.1%, 0.2%, 0.5% and 1% $Ca(OCl)_2$ were prepared in distilled water. Similar solutions were prepared at pH 2 (pH lowered with 0.1 N HCl).

These solutions (25 ml.) were added to individual beakers containing 6 pieces of nylon macaroni which had been previously allowed to "brown" by adsorption from beer.

All solutions remained in contact with the nylon for two hours but times were recorded when visual bleaching was complete.

| Regenerant: | | Visual bleaching time |
|---|---|---|
| 0.05% | pH10 | no change in two hours |
| | pH2 | Do. |
| 0.1% | pH10 | Do. |
| | pH2 | Do. |
| 0.2% | pH10 | Do. |
| | pH2 | Do. |
| 0.5% | pH10 | partial bleaching |
| | pH2 | Do. |
| 1.0% | pH10 | approximately ½ hour |
| | pH2 | Do. | pH appeared to have no effect upon regenerating time.

EXAMPLE 4

200 ml. of 1% wt./volume $Ca(OCl)_2$ was prepared in distilled water. 4 portions of 0.13 g. of previously browned nylon powder ("Polypenco") were weighed into 100 ml. beakers. The following regenerants and conditions were used.

1—Regenerated—60 min. with 1% $Ca(OCl)_2$—20° C.
2—As #1 plus stirring
3—As #1 but 2% $Ca(OCL)_2$
4—As #1 but at 60° C.

After regeneration, the nylons were filtered through a coarse sintered glass crucible, washed well with distilled water and then added to separate 250 ml. portions of beer.

The beer was slowly magnetically stirred for one hour, then filtered through "Whatman" #42 paper and anthocyanogens determined in duplicate on each.

An anthocyanogen value was also obtained for the original beer.

Analytical values

| | Anthocyanogens—(Duplicate analysis) p.p.m. |
|---|---|
| Original beer | 55 |
| #1 | 32–30 |
| #2 | 30–32 |
| #3 | 34—sample lost |
| #4 | 28–24 |

EXAMPLE 5

Small losses occur when a weighed quantity of nylon is repeatedly filtered. Even though these losses are small, they nevertheless represent 10 to 20% of the total when working in the 0.1 to 0.2 region.

Consequently, if a constant weight of adsorbent is required, indirect procedures must be used.

Thus, we elected to keep a reservoir of nylon suspended in beer from which we could draw small weights of nylon for determination of adsorptive capacity both before and after regeneration. Similarly spent nylon was kept in a beer reservoir. It was filtered off and readded to fresh beer as a control at each regeneration stage (to show that bleach treatment was responsible for regeneration).

EXPERIMENTAL 0.8 g. of fresh dry "Polypenco" 100 mesh nylon was added to 1600 ml. of beer and slowly magnetically stirred for two hours (to allow complete saturation of the nylon surface).

The nylon-beer suspension was filtered through a Buchner funnel (#1 paper), and the nylon gathered for regeneration.

The nylon was washed free of beer with distilled water and stirred for 60 min. with 100 ml. of 1% $Ca(OCl)_2$ solution. It was then thoroughly washed with water, flushed with 2 ml. of methanol to remove the water and dried in the hot air oven at 80° C. for 15 minutes.

A nylon sample of 0.10 g. was accurately weighed and added to 200 ml. of beer (washed into beer with part of the 200 ml.). This was slowly magnetically stirred for one hour.

The beer was filtered through a coarse sintered glass crucible then sampled in duplicate for anthocyanogens. The nylon was discarded.

The remaining 0.7 g. of nylon was placed in 1400 ml. of beer (reservoir) and stirred for two hours. The nylon was reclaimed by filtration, washed and regenerated with $Ca(OCl)_2$. The above procedure was repeated for four regenerations using the same nylon to beer ratio. The same beer was used throughout.

A control was handled similarly except that regeneration was not attempted (the nylon was repeatedly used for beer treatment without bleaching at any stage).

Duplicate samples were taken for analysis from the original beer and the beer and control after each nylon treatment.

Analytical values

All values represent an average of duplicate determinations.

| | Anthocyanogens, p.p.m. |
|---|---|
| Original beer | 72 |
| Beer after nylon treatment | 52 |
| P.p.m. removed by nylon | 20 |

BEER ANALYZED AFTER NYLON TREATMENT

| | Control (spent nylon) | Regenerated nylon |
|---|---|---|
| After 1st regeneration | 60 | 40 |
| After 2nd regeneration | 72 | 58 |
| After 3rd regeneration | 70 | 47 |
| After 4th regeneration | 68 | 53 |

| | p.p.m. |
|---|---|
| Original nylon anthocyanogen adsorption | 20 |
| After 1st regeneration | 32 |
| After 2nd regeneration | 14 |
| After 3rd regeneration | 25 |
| After 4th regeneration | 19 |
| Control adsorption: | |
|     After 1st treatment [1] | 12 |
|     After 2nd treatment | 0 |
|     After 3rd treatment | 2 |
|     After 4th treatment | 4 |

[1] Apparently the first nylon control was not fully spent.

What we claim as our invention is:

1. A method of regenerating nylon which has been used to stabilize beer which comprises contacting the nylon with a dilute hypochlorite bleach solution containing at least about 0.5% by weight of a hypochlorite selected from calcium hypochlorite and sodium hypochlorite.

2. A method according to claim 1, wherein the solution contains between about 0.5% and 5% by weight of said hypochlorite.

References Cited
UNITED STATES PATENTS 3,053,664  9/1962  Hall et al. _____ 99—48
3,418,135  12/1968  Bayne _____ 260—586X PATRICK P. GARVIN, Primary Examiner P. E. KONOPKA, Assistant Examiner U.S. Cl. X.R.

99—48; 252—412, 426; 260—586